United States Patent Office 3,395,072
Patented July 30, 1968

3,395,072
PAPER COATING COMPOSITIONS OF SYNTHETIC LATEX AND GLYOXAL AND PAPER COATED THEREWITH
Pierre Talet, Alfortville, and Louis Gandon, Trosly-Breuil, France, assignors to Nobel-Bozel, Paris, France, a joint-stock company of France
No Drawing. Filed May 11, 1965, Ser. No. 454,996
Claims priority, application France, May 13, 1964, 974,389
7 Claims. (Cl. 162—169)

ABSTRACT OF THE DISCLOSURE

The present disclosure relates to coating compositions for paper intended to withstand the effects of humidity which compositions comprises a synthetic latex and glyoxal. The preferred synthetic latex is a co-polymer of a vinylic ester of a fatty acid of low molecular weight and an acrylic ester of an alcohol of relatively high molecular weight. The present compositions can comprise either the entire coating contemplated or they may be added as a portion, such as 10–50%, of a normal coating composition comprising casein or starch.

---

The final qualities of a paper and a cardboard depend of course on the nature of the material of which they are made and on the type of machine and its variables which have been employed in the manufacturing process. They also depend to a large extent on the additional treatments to which these papers have been subjected. Amongst these, the treatments of surface coating appear to be the most important. Generally, there is deposited on the sheet an aqueous coating constituted by an adhesive: this is surfacing.

Coating is a similar operation for which a loaded or pigmented coat is employed. The function of the adhesive is manifold.

First of all, it gives a better appearance to the paper either in that the aspect of the paper is changed or even that the feel or the handling qualities of the paper are modified.

It ensures the binding of the fibrils to the sheet, preventing these latter from becoming detached, which would result in inacceptable defects of printing.

In the case of coating, it enables the pigmentary particles to be fixed on the sheet.

It renders uniform the absorption of the printing inks and varnishes.

It increases the dimensional stability by reinforcing the internal bonds of the fibres and by eliminating the destructive action of the water.

The adhesives which have been proposed are already numerous. The most frequently employed up to the present time is casein. This substance has a good binding power and, by utilizing a carefully selected pigmentary composition, coatings are obtained which resist water satisfactorily; however, they do not permit working with high concentrations of solid materials; the coatings obtained have poor stability and confer to the paper the characteristic odor of casein.

The binding power of fluidified starches and feculae, although much lower, permits or offers the possibility of preparing more heavily-loaded dispersions, comprising more conventional and cheaper pigments. In addition to the economic advantage, starch permits absolutely colourless coatings to be obtained, but this resistance to water is very poor.

Other materials such as the soluble celluloses, especially carboxy-methyl-cellulose, the soluble acrylates, the polyvinyl alcohols, the latexes of co-polymers and interpolymers, have also been proposed in place of the adhesives previously referred to; their high cost is not compensated by their qualities, namely ease of application, colourless and highly adhesive coatings.

In any event, the resistance to water of the coatings comprising these latter binders remains very mediocre and is not suitable for the commercial development of washable wallpapers or papers intended for offset printing. Generalized use of the latexes of styrene-butadiene, of vinyl and acryl-vinyl or acrylic resins, has made it possible partly to overcome these drawbacks. Thus, the latexes of styrene-butadiene added to sauces comprising casein result in more flexible films which, after calendering, produce a more pronounced gloss and have a good resistance to water.

It is also known that the formulae of coatings containing starch and kaolin easily withstand the addition of large quantities of vinyl-acrylic or acrylic latexes, which especially enables the proportions of filler to be increased, at the same time also improving the characteristics of plasticity and resistance to moisture of the coating.

However this may be, in order to be valid, the additions of latex must be carried out in a massive manner and it is a minimum of one-third of the conventional binder which must be replaced by latex if it is desired to obtain appreciable effects. It goes without saying that such modifications of the compositions of coatings lead, in addition to an increase in the production costs, to certain difficulties such as for example the blocking-up by the latexes of the transfer felts of the colours on the printing machines for wallpapers.

Attempts have also been made to utilize purely and simply as a surfacing treatment, acrylic latex or an acrylo-vinyl copolymer free of filler so as to give a better stability of the paper in the wet state and a satisfactory elasticity for certain uses such as the manufacture of cloths, handkerchieves and serviettes of cellulose.

When the deposit is too small, the effect obtained is negligible whereas by increasing the doses, the characteristics of absorption become too poor. The application of cationic latex which limits the penetration of the substance has not enabled this drawback to be overcome.

It is known, furthermore, that glyoxal rapidly confers high wet strength to coatings comprising starch, kaolin or chalk-kaolin. The degree of strength depends of course on the type of starch, on the pH value and also on the concentration of glyoxal. It is assumed that in order to have valid effects, in particular in the manufacture of washable wallpapers, it is necessary to employ percentages greater than 10% (caluculated dry on dry) with respect to oxidized starch, if it is desired to obtain a substantial effect on the washability of the coating. This phenomenon is unfortunately accompanied by an increase in the fragility of the paper (a reduction of the indices of tearing and of the double fold). These incidents are explained by the fact that glyoxal has a tendency to form three-dimensional systems with starch and cellulose, which limits the possibilities of slip of the chains of these polymers.

For the formation of offset coatings containing starch, in which the requirements of resistance to wet rub are less severe than in the previous case, and for which, for this reason, percentages of glyoxal are employed less than 5%—generally from 3 to 5%—a reduction is already found in certain mechanical qualities of the paper, sometimes accompanied by a coloration of the paper.

In any case, if the proportions of glyoxal in these coatings were increased, the same difficulties would be encountered as in the case of the use of casein, namely: high cost and substantial increase in viscosity.

In other cases, especially in the wallpaper industry, it has been suggested to eliminate all these technical difficulties by carrying out the treatment known as "surfacing." This treatment consists of coating or covering a plain colour sized or printed paper, either with a coating of latex or with a coat of glyoxal.

In the first case, the results obtained are good, provided that the weight of active material deposited reaches a certain value; it is considered necessary to deposit 10 to 20 grams of an acrylic latex per square metre in order to obtain a paper which complies with the specifications of washability. These conditions are of course not very economical.

In the second case, it is known that it is only necessary to have 1 to 2 grams of glyoxal per square metre in order to obtain a satisfactory effect. On the other hand, not only is this small quantity sufficient to increase the fragility of the paper, but it does not give sufficiently permanent effects, especially when the coatings include calcium carbonate as a pigment.

Numerous methods and techniques have furthermore been proposed in order to increase the wet strength of coatings comprising starch and kaolin, either by adding products resistant to water such as wax emulsions, or by completing the surfacing by the addition to the spraying composition, of water-repellent metallic salts. Although these methods have had some success, they are not absolutely satisfactory and cannot be put into general use because the waxes modify the decorative appearance of the papers and because the water-repellent salts may have an adverse action, either directly on the colours or indirectly for the subsequent operations such as in particular the pasting of wallpapers.

Furthermore, in this case also, it is known that the application of glyoxal alone to the surface of a paper gives it a very valuable temporary wet strength. Unfortunately, glyoxal, which forms short links, does not enable flexible papers to be obtained such as are desirable for domestic applications.

Now, the present invention overcomes these drawbacks and provides coating or surfacing compositions for papers intended to withstand humidity—those for offset printing for example or for decorative wallpapers, or again paper intended for the manufacture of cloths, serviettes, handkerchiefs—these compositions being characterized by the fact that they contain a synthetic latex and glyoxal, combining at the same time the functions of an adhesive agent and an anti-release agent.

The synthetic latexes preferably comprise a co-polymer of a vinylic ester of a fatty acid of low molecular weight and an acrylic ester of an alcohol of relatively high molecular weight. The synthetic latex may also be an acrylic co-polymer or an acrylic mono-polymer, or even a styrene-butadiene co-polymer.

The glyoxal may be added either to the latex, in which case it will be added in proportions and in a concentration such that it gives the desired effects, or in the coating after all the various constituents of the bath have been mixed.

These compositions can enter directly into the constitution of a coating bath in replacement of a part (for example from 10 to 50%) of casein or starch. They may also be employed advantageously, after dilution, for any surfacing treatment without the machine, this being effected by any of the known techniques (spraying, flat air-jet, dipping).

In the case of replacement in a coating bath of casein or starch by the composition according to the invention, the order in which the various constituents are introduced into the bath is always as follows:
(1) Filler previously put into dispersion;
(2) Solution of adhesive;
(3) Composition according to the invention;
(4) Additional water to obtain the final concentration and viscosity desired.

In accordance with an alternative form, the addition of the elements of the composition according to the invention can be made separately, for example by adding, in the order of introduction of the various constituents of a coating bath, the latex followed by the glyoxal. In this case, it is only necessary to regulate the pH value, to choose the fillers and to utilize an adhesive of appropriate viscosity so that the glyoxal can play its part, namely, giving to the coating a high resistance to moisture. Proportions will normally be used, calculated on the basis of dry products, such that for one part of a starchy or protein adhesive, there is 0.1 to 1 part of synthetic resin and from 0.02 to 0.10 part of glyoxal.

Although no limit is given in the respective proportions of synthetic resin and glyoxal, it is preferable to provide dispersions comprising, on the basis of dry products, of 20 to 80 parts by weight of synthetic resin to 80 to 20 parts by weight of glyoxal, the concentration of the final composition being from 1 to 60%, and preferably from 40 to 50% approximately, the pH value being adjusted so that the whole composition is stable.

Although the composition of the polymers or co-polymers does not appear to have any great importance, preference will however be given to the acryl-vinylic co-polymers or the acrylic mono-polymers the compatibility of which with cellulose and starchy adhesive is generally good.

The composition according to the invention may also contain emulsifying agents such as non-ionic emulsifying agents, for reasons of compatibility.

The invention also relates to the coated or surfaced papers manufactured from compositions such as those defined above. It has been found that the coating mixtures or coating compositions containing at the same time a synthetic latex and glyoxal—combining simultaneously the functions of an adhesive agent and a stabilization agent in the wet state—give new qualities to the paper under the best conditions of economy. Thus, in these compositions the glyoxal rapidly gives, in the presence of latex, a high resistance to moisture and the latex limits on the one hand the increase in the viscosity of the sauces when the latter comprise other adhesives and fillers, and also reduces the difficulties inherent with its use, that is to say the non-permanence of the wet strength after immersion or washability with coatings containing chalk or calcium carbonate and the fragility due to the inadequate flexibility of the coatings.

It has been found that under these conditions, only small quantities of these compositions are necessary in order to obtain remarkable effects, greatly superior to those which would be obtained by the use of only one of the constituents.

The examples given below which have been carried out with success, clearly show how it is possible to manufacture coated papers, printed wallpapers, or surfaced papers complying with the new characteristics mentioned above.

In these examples, the parts and the percentages are given by weight, failing indication to the contrary.

EXAMPLE 1

First operation

Following a process of enzymatic conversion, 66 parts by weight of potato starch are degraded in the presence of 264 parts of water. The operation is carried out following known methods. A cooking operation is carried out so that the final viscosity of the starch converted to a 20% solution, is compatible with its use for coatings using an air knife coater. In the present case, the viscosity was 75 centipoises at 80° C., measured with the Brookfield torsiometer with the moving system 1, at a speed of rotation of 100 r.p.m.

Second operation 330 parts by weight of fine particles of kaolin for coating, are mixed with two parts of a liquifying agent such as hexa-metaphosphate and 300 parts of water. The operation is carried out in a high power mixer so as to obtain a thick and uniform mixture.

Third operation

In the mixer containing the weight of kaolin, there is slowly added to the mixture resulting from the second operation that obtained from the first operation. When the whole mixture is homogeneous and brought to 20° C., the resulting dispersion is fractionated. To each part there are added variable proportions, either of latex or of glyoxal, or of both.

The composition of the aqueous anionic latex employed is that of an acryl-vinylic co-polymer comprising vinyl acetate, 2-ethyl-hexyl-acrylate, plastified by di-butyl-phthalate. The protection is ensured by acrylic acid residues.

This co-polymer is manufactured and sold commercially by the applicants under the name of Cotacryl 156.

The glyoxal employed is a 30% commercial solution.

A coating of the paper is effected on a Dixon coating machine utilizing an air knife, and the characteristics of the papers obtained are examined.

The results are shown in Table I below.

TABLE I

| Glyoxal 30% | 0.3 | 0.3 | 0.3 | 0.3 | 0.6 | 0.6 | 0.6 | 0.6 | 0.9 | 0.9 | 0.9 | 0.9 |
|---|---|---|---|---|---|---|---|---|---|---|---|---|
| Cotacryl 156 | 0 | 2 | 4 | 6 | 0 | 2 | 4 | 6 | 0 | 2 | 4 | 6 |
| Washability | 15 | 30 | 38 | 50 | 33 | 56 | 70 | 86 | 65 | 80 | 100 | 110 |

EXAMPLE 2

First operation

A dispersion is prepared for coating with a trailing blade, following a process of cooking in one phase. This process consists of mixing the starch, the kaolin, and the fluidifying agent, and continuously transferring this milk from one vessel to another by means of a steam injector which causes continuous bursting of the starch. The mixture obtained has the following composition:

| | Parts |
|---|---|
| Kaolin "Dinkie A" of the Pochin Co. | 52 |
| Sodium hexa-metaphosphate | 0.3 |
| "Viscosol 310" (oxidized sago starch) | 7 |
| Water, q.s. 100 parts. | |

To this basic composition there are incorporated various resins and variable quantities of glyoxal.

The resins employed are latexes of acryl-vinylic co-polymers, such as "Cotacryl 156" defined above in Example 1, and "Cotacryl 157," the composition of which is identically the same, but which comprises a cellulose colloid protector instead of the acrylic acid resins.

After adjusting the pH value to 7, these new mixtures were applied on a paper by means of the trailing blade of the Dixon coating machine.

The results are shown in Table II below.

TABLE II

| Glyoxal 30% | 0 | 0 | 0.7 | 1.1 | 0.7 | 1.1 |
|---|---|---|---|---|---|---|
| Cotacryl 156 or Cotacryl 157 | 0 | 14 | 0 | 0 | 14 | 14 |
| Washability | 2 | 3 | 7 | 10 | 13 | 17 |

EXAMPLE 3

A coating is prepared for application following the Massey process, the viscosity of which is 100 poises at 20° C., the measurement being made by the Brookfield apparatus at 50 r.p.m.

This coating has the following compositions:

| | Parts |
|---|---|
| Clay, type "Dinkie A" | 45 |
| Sodium hexa-metaphosphate | 0.2 |
| Oxidized fecula type "Viscosol 218" (oxidized starch) | 1.8 |
| Polyvinyl alcohol | 1.8 |
| Water, q.s. 100 parts. | |

As in the previous examples, this composition is divided up and there are added to it variable quantities of 30% glyoxal and an aqueous synthetic latex of styrene-butadiene namely Butakon SL 103 (a styrene-butadiene copolymer). A coating is carried out on the machine. The papers obtained have the characteristics which are summarized in Table III below:

TABLE III

| Glyoxal 30% | 0 | 1.3 | 0 | 1.3 |
|---|---|---|---|---|
| Butakon SL 103 | 0 | 0 | 1.8 | 1.8 |
| Washability | 4 | 15 | 10 | 55 |

EXAMPLE 4

A base coating for wallpapers is made by dispersing a weight of chalk with a binder having a base of potato starch converted by enzyme following the process described in Example 1, but working with a concentration of 15% instead of 20%.

The base coating has the following composition:

| | Parts |
|---|---|
| Chalk of the type "BLP 2" (calcium carbonate) | 50 |
| Binder of starch converted by enzymes at a concentration of 15% | 25 |
| Dispersed dye of a water dispersible pigment | 0.5 |
| Water | 24.5 |

To compositions of this kind there are added variable proportions of glyoxal and a vinyl acrylic co-polymer with 55% of active material and constituted by vinyl acetate and ethyl acrylate, the plastification being effected by hexylene-glycol.

This co-polymer is manufactured by the applicants and sold commercially under the name of Nobelacryl VA 20 H.

The preparations thus obtained are coated on a paper of the type Afnor 2 by means of the air knife of the Dixon coating machine. The results obtained are shown in Table IV below.

TABLE IV

| Glyoxal 30% | 0 | 2.5 | 5 | 0 | 0 | 2.5 | 2.5 | 5 | 5 |
|---|---|---|---|---|---|---|---|---|---|
| Nobelacryl VA 20 H | 0 | 0 | 0 | 10 | 15 | 10 | 15 | 10 | 15 |
| Washability | 5 | 30 | 55 | 27 | 49 | 105 | 120 | 165 | 205 |
| Tearing carried out on 10 sample pieces | 49 | 38 | 35 | 40 | 45 | 50 | 55 | 47 | 52 |
| Double fold carried out on 500 grams | 33 | 10 | 6 | 30 | 38 | 20 | 28 | 18 | 25 |

EXAMPLE 5

There is effected a ground coating for relief, applicable to a wall paper intended for the manufacture of decorative paper, by mixing together talc, kaolin and a carboxy-methyl-cellulose.

This coating has the following composition:

| | Parts |
|---|---|
| Talc, quality O | 30 |
| Kaolin of the type "ADIS" of the Pochin Co. | 30 |
| Carboxy-methyl-cellulose of low viscosity | 3.2 |
| Sodium hexa-metaphosphate | 0.36 |
| Coloring agent | 0.44 |
| Water | 36 |

To 100 parts by weight of this composition there are added on the one hand variable and progressive quantities of 30% glyoxal or of vinyl acrylic or acrylic resins in the form of latexes of aqueous co-polymer, and on the other hand mixtures of the two.

The latexes employed are:
Either the vinyl acrylic co-polymer defined as in the previous example by the name of "Nobelacryl VA 20 H";
Or a pure acrylic co-polymer manufactured and sold commercially by the applicants under the name of "Nobelacryl 136" and derived from ethyl acrylate, methyl methacrylate and acrylic acid.

The commercial dispersion is at a concentration of 45/46%.

As regards washability, the results are indicated in the following table:

TABLE V

| Glyoxal 30% | 0 | 0.75 | 1.5 | 0 | 0 | 0.75 | 1.5 | 0.75 | 1.5 |
|---|---|---|---|---|---|---|---|---|---|
| Nobelacryl 136 | 0 | 0 | 0 | 10 | 20 | 10 | 10 | 20 | 20 |
| Washability | 10 | 100 | 150 | 45 | 110 | 110 | 160 | 180 | 210 |

Particular note will be made of the smoothness of the contours in relief, their high adherence and their plasticity. It is certain that in the absence of glyoxal but in the presence of resins, it would have been possible to obtain good fineness of relief, but the degree of resistance to wet rub would have been extremely bad. Furthermore, the utilization of glyoxal pure and simple results in hard and breakable reliefs.

EXAMPLE 6

Finally, the favourable influence of the additions of a latex to the basic coatings intended for the manufacture of wallpapers shows itself with particular clearness in the case of the application of the method described in the U.S. Patent No. 2,867,615 of Jan. 6, 1959.

In fact, the coatings obtained in accordance with this process, while having good spongeability, tolerate badly supplementary additions of glyoxal, which make them breakable and fragile. In this case, the papers obtained have a tendency to "tilting" and they present considerable difficulties in re-reeling. It has been found that the simultaneous addition of a vinyl-acrylic or acrylic aqueous latex such as Nobelacryl VA 20 or Nobelacryl 136 described above, gave all the desirable qualities of these coatings.

By way of example, the following method of operation is given:

(1) Preparation of 100 kg. of binder 72.2 litres of cold water are poured into a vessel provided with a turbo-agitator or into a suitable mixer;
24.15 kg. of potato starch at 16% humidity is dispersed while stirring;

There are added:

0.33 kg. of bi-hydrated oxalic acid
2.88 kg. of crystallised glyoxal or the equivalent of 30% glyoxal;
The stirring is continued and the mixture is heated to 90° C. (at the moment of the formation of the paste, a thickening is observed which continues until a gel is formed; the heating and stirring are continued until fluidification occurs);
The heating is stopped when the viscosity reaches 50 centipoises at 90° C.;
The mixture is neutralized with care by means of 0.41 kg. of calcium carbonate.
When a pH value of between 5.5 and 6 has been reached, the adhesive is ready for use.

(2) Preparation of 100 kg. of paste filler+pigments 71.1 kg. of Micromya chalk are dispersed in 26.7 litres of water and the self-dispersing pigment is added (2.2 kg. in this example).
The dispersion is continued until it is perfectly homogeneous.

(3) Preparation of the coating

The good rate of sizing of 10% is obtained by mixing 2.45 parts of pigmentary paste and 1 part of binder.
The viscosity of the coating is 175 centipoises at 20° C.

3.2 kg. of "Nobelacryl VA 20" and 0.68 kg. of crystallized glyoxal are mixed while stirring;
After 15 minutes stirring, the coating is ready for use; its viscosity is 300 centipoises at 20° C.

The plinometer washing test, after 24 hours conditioning of the wall paper manufactured with this coating, exceeds 250.

In the case where the "body" of the coating is insufficient (the case of rapid printing machines with several ink-troughs), 10 to 25% of the starchy binder is replaced by the same volume of a carboxy-methyl starch or carboxy-methyl cellulose of very low viscosity at 1/5.

There are given below, in the form of a table, the respective addition of "Nobelacryl VA 20" and crystallized glyoxal, as a function of the performances of washability obtained for a proportion of sizing of 10%:

TABLE VI

| Plinometer test after 24 hours conditioning | 45/50 | 100/110 | 160/165 | 250 |
|---|---|---|---|---|
| 1. Binder Formula: | | | | |
| Fecula | 24.15 | 24.15 | 24.15 | 24.15 |
| Hexa-metaphosphate | 0.33 | 0.33 | 0.33 | 0.33 |
| Crystallized glyoxal | 2.58 | 2.58 | 2.58 | 2.58 |
| Oxalic acid | 0.33 | 0.33 | 0.33 | 0.33 |
| Calcium carbonate | 0.41 | 0.41 | 0.41 | 0.41 |
| Water | 72.20 | 72.20 | 72.20 | 72.20 |
| | 100.00 | 100.00 | 100.00 | 100.00 |
| 2. Filler Paste+Pigment: | | | | |
| Micromya chalk | 71.1 | 71.1 | 71.1 | 71.1 |
| Pigment | 2.2 | 2.2 | 2.2 | 2.2 |
| Water | 26.7 | 26.7 | 26.7 | 26.7 |
| | 100.00 | 100.00 | 100.00 | 100.00 |
| 3. Coating: | | | | |
| 2 (Pigment) | 2.45 | 2.45 | 2.45 | 2.45 |
| 1 (Binder) | 1 | 1 | 1 | 1 |
| 4. "Nobelacryl VA 20", per 100 kg. of coating | | 2.15 | 3.20 | 3.20 |
| 5. Crystallized Glyoxal, per 100 kg. of coating | | 0.34 | 0.34 | 0.68 |
| Viscosity (cp./20° C.) of the coating | 175 | 230 | 280 | 300 |

It will be observed that the excellent degree of washability obtained in the examples of Table VI also permits of an improvement of the other characteristics of the coating, that is to say an increase in resistance to fatigue (double fold), of the resistance to bursting (Mullen), and the resistance to tearing as compared with a sample.

EXAMPLE 7

This example illustrates a surfacing operation such as has been obtained industrially by the application of compositions by means of the air knife on one-washable wallpapers.

A commercial non-washable wallpaper is given an after-treatment with a mixture of latexes, the composition of which is as follows:

|  | Parts by weight |
|---|---|
| "Cotacryl 157" | 55.60 |
| "Nobelacryl 149" | 18.40 |
| Water | 26 |

A washable coating is obtained on condition that 10 grams of dry material are deposited per square metre of wallpaper. A similar quantity, including a judicious quantity of glyoxal gives identical or even superior effects when 2 to 3 grams of dry material have been deposited per square metre.

These results are obtained with the composition manufactured by the present applicants under the name of ACROX I, comprising the following products:

Cotacryl 157;
Nobelacryl 149;
30% glyoxal and water.

The "Nobelacryl 149" is an aqeuous latex having 40% concentration, constituted by an acrylic co-polymer consisting of: Ethyl acrylate, butyl acrylate and methyl metacrylate.

EXAMPLE 8

This example illustrates a surfacing operation for paper carried out in the laboratory with mixtures of glyoxal and latex only on thin unsized papers intended for example for the manufacture of toilet articles such as handkerchieves and hand towels.

In order to clearly show the synergy effect which exists between the synthetic polymer and the glyoxal, the application was made of a fixed quantity of dry material, whether this latter is constituted by glyoxal alone, the acrylic latex, manufactured and sold commercially by the applicants under the name Nobelacryl 136 and the mixture in variable proportions of the two elements.

The operation was effected on two types of pulp:

That which has been given the No. 1 had a base of 50% of bleached hornbeam pulp and 50% of resinous wood bisulphite pulp;

That which has a No. 2 was constituted by 50% of bisulphite pulp and 50% of crude kraft originating from Finland.

In both cases, refining was carried out up to 30° S-R on the Dutch battery, the pH value was adjusted to 6.5 and paper samples of 30 grams per square metre were formed before proceeding to the surfacing operation.

For a uniform deposit of 1.25 grams and 0.62 gram of dry material per square metre, the following results were obtained:

wet state during the first 30 minutes of the surfacing with the mixtures in the proportions of 1 to 1.

Thus, with respect to pulp No. 1:

0.62 gram of Nobelacryl gives a value of 135 at 10 sec.
0.62 gram of glyoxal gives a value of 209 at 10 sec.

The arithmetic sum is 344 for 1.24 grams of material deposited.

Now, the mixture deposited at the rate of 1.25 grams gives 852, whereas the glyoxal and the acrylic alone under the same condtions only give respectively 612 and 128. The same observation can be made for 10 minutes of immersion.

EXAMPLE 9

The same procedure is followed as in Example 8, employing this time commercial papers as a support and the size-press as the surfacing means.

Paper No. 1 is constituted by a mixture of kraft and bleached recuperation paper, unsized, of 83 grams; paper No. 2 is sold commercially under the name of "Joseph paper" (a very thin sheet of transparent paper formed from bleached chemical plup) of 20 grams.

The measurements were carried out in the direction of movement SM and in the transverse direction ST.

UNIFORM DEPOSIT OF 1.25 GRAMS OF DRY MATERIAL TOTAL PER SQUARE METER

| | Pulp No. 1 | | | | | Pulp No. 2 | | | | |
|---|---|---|---|---|---|---|---|---|---|---|
| | Control | Glyoxal alone | Nobelacryl 136 alone | Glyoxal and Nobelacryl 136 | | Control | Glyoxal alone | Nobelacryl 136 alone | Glyoxal and Nobelacryl 136 | |
| | | | | Prop. 1/1 | Prop. 2/1 | | | | Prop. 1/1 | Prop. 2/1 |
| Length of break— | | | | | | | | | | |
| In the conditioned state | 2,990 | 2,208 | 2,883 | 3,054 | 2,935 | 4,584 | 3,657 | 3,953 | 3,778 | 3,724 |
| Dipped for 10 sec | 89 | 612 | 128 | 852 | 200 | 115 | 467 | 119 | 505 | 359 |
| Dipped 10 min | 72 | 295 | 125 | 368 | 117 | 107 | 283 | 117 | 297 | 201 |
| Dipped 30 min | (1) | 153 | 120 | 229 | 106 | <100 | 152 | 109 | 187 | 189 |
| Dipped 1 hour | (1) | 153 | 116 | 100 | 100 | (1) | 149 | 100 | 149 | 151 |

[1] Disintegrated.

UNIFORM DEPOSIT OF 0.62 GRAM OF DRY MATERIAL TOTAL PER SQUARE METER

| | Pulp No. 1 | | | | | Pulp No. 2 | | | | |
|---|---|---|---|---|---|---|---|---|---|---|
| | Control | Glyoxal alone | Nobelacryl 136 alone | Glyoxal and Nobelacryl 136 | | Control | Glyoxal alone | Nobelacryl 136 alone | Glyoxal and Nobelacryl 136 | |
| | | | | Prop. 1/1 | Prop. 2/1 | | | | Prop. 1/1 | Prop. 2/1 |
| Length of break— | | | | | | | | | | |
| In the conditioned state | 2,990 | 2,914 | 2,534 | 2,650 | 2,880 | 4,584 | 4,277 | 4,209 | 4,097 | 4,165 |
| Dipped for 10 sec | 89 | 209 | 135 | 149 | 129 | 115 | 300 | 119 | 262 | 230 |
| Dipped 10 min | 72 | 136 | 125 | 106 | 106 | 107 | 180 | 112 | 149 | 115 |
| Dipped 30 min | (1) | 130 | 103 | 104 | 100 | <100 | 136 | 108 | 130 | 100 |
| Dipped 1 hour | (1) | 115 | <100 | 100 | <100 | (1) | 105 | <100 | 106 | <100 |

[1] Disintegrated.

An examination of the tables shows clearly that the effects of the glyoxal and the acrylic latex are more than additive, especially as regards the strength in the Homogeneous deposits were made of 0.62 and 1.25 grams per square metre of surface.

The results are summarized in the two tables which follow:

DEPOSIT OF 0.62 GRAM OF DRY MATERIAL PER SQUARE METER

| | PAPER No. 1 | | | | | | | | | | PAPER No. 2 | | | | |
|---|---|---|---|---|---|---|---|---|---|---|---|---|---|---|---|
| | Control | | Glyoxal alone | | Nobelacryl 136 alone | | Nobelacryl 136+ glyoxal | | | | Control | Glyoxal alone | Nobelacryl | Nobelacryl 136+ glyoxal | |
| | | | | | | | Prop. 1/1 | | Prop. 2/1 | | | | | | |
| | SM | ST | SM | ST | SM | ST | SM | ST | SM | ST | | | | Prop. 1/1 | Prop. 2/1 |
| Length of break— | | | | | | | | | | | | | | | |
| Dry | 2,586 | 1,711 | 3,116 | 1,879 | 2,538 | 1,534 | 2,795 | 1,775 | 2,819 | 1,759 | 2,466 | 2,566 | 2,100 | 2,466 | 2,000 |
| Dipped 10 sec | 361 | 418 | 715 | 442 | 458 | 394 | 546 | 498 | 538 | 538 | 167 | 766 | 167 | 433 | 366 |
| Dipped 10 min | 345 | 375 | 522 | 321 | 321 | 221 | 482 | 361 | 361 | 257 | 150 | 467 | <100 | 283 | 187 |
| Dipped 30 min | 329 | 257 | 434 | 257 | 265 | 221 | 361 | 241 | 337 | 257 | <100 | 366 | | 176 | 167 |
| Dipped 1 hour | 321 | 185 | | | 273 | 205 | | | 329 | 257 | | | | | |

NOTE.—For paper No. 2, the measurements have only been made in the direction of working.

DEPOSIT OF 1.25 GRAMS OF DRY MATERIAL PER SQUARE METER

| | PAPER No. 1 | | | | | | | | | | PAPER No. 2 | | | | |
|---|---|---|---|---|---|---|---|---|---|---|---|---|---|---|---|
| | Control | | Glyoxal alone | | Nobelacryl 136 alone | | Nobelacryl 136+ glyoxal | | | | Control | Glyoxal alone | Nobelacryl | Nobelacryl 136+ glyoxal | |
| | | | | | | | Prop. 1/1 | | Prop. 2/1 | | | | | | |
| | SM | ST | SM | ST | SM | ST | SM | ST | SM | ST | | | | Prop. 1/1 | Prop. 2/1 |
| Length of break— | | | | | | | | | | | | | | | |
| Dry | 2,586 | 1,711 | 2,380 | 1,775 | 2,715 | 1,815 | 2,482 | 1,791 | 2,755 | 1,775 | 2,466 | 2,433 | 2,533 | 2,500 | 2,867 |
| Dipped 10 sec | 361 | 418 | 980 | 506 | 490 | 434 | 1,076 | 570 | 659 | 402 | 167 | 1,067 | 167 | 1,066 | 633 |
| Dipped 10 min | 245 | 375 | 747 | 393 | 305 | 337 | 699 | 426 | 514 | 313 | 150 | 866 | 160 | 666 | 433 |
| Dipped 30 min | 329 | 257 | 506 | 345 | 337 | 225 | 546 | 305 | 402 | 249 | <100 | 467 | 157 | 487 | 300 |
| Dipped 1 hour | 321 | 185 | 442 | 265 | 297 | 185 | 506 | 281 | 369 | 193 | | | | | |

NOTE.—The observations made with regard to Example 8 are repeated here in a still clearer manner.

We claim:

1. An aqueous coating composition for paper consisting essentially of (1) a synthetic latex the solids of which constitute 20–80 parts by weight of said composition, said solids being selected from the group consisting of co-polymers of vinyl ester and acryl ester, acryl-homo-polymers and styrene-butadiene copolymers; (2) an emulsifying agent; and (3) glyoxal, said glyoxal constituting 80–20 parts by weight of said composition; said composition having a concentration of 1–60%.

2. A composition as claimed in claim 1, in which said emulsifying agent is chosen from the group of the non-ionic emulsifying agents.

3. A coating composition in accordance with claim 1 wherein said concentration is 40–50%.

4. A composition in accordance with claim 1 wherein said solid content of said synthetic latex comprises a vinyl homo-polymer.

5. A composition in accordance with claim 1 wherein said solid content of said latex comprises a vinyl-acryl copolymer.

6. In the method of coating paper, the improvement relating to increasing the wet strength of such paper comprising applying to the paper to be treated a coating composition consisting essentially of from 20 to 80 parts of a synthetic latex of a resin selected from the group of the co-polymers of vinyl ester and acryl ester, acryl homo-polymers, styrene-butadiene co-polymers, including at least one emulsifying agent and from 80 to 20 parts of glyoxal, and drying the so-coated paper.

7. A method as claimed in claim 6, in which said emulsifying agent is a non-ionic emulsifying agent.

References Cited

UNITED STATES PATENTS

| | | | |
|---|---|---|---|
| 2,616,818 | 11/1952 | Azorlosa | 117 |
| 2,622,960 | 12/1952 | Woods et al. | 162—158 X |
| 3,028,340 | 4/1962 | Gandon et al. | 117—154 X |
| 3,256,221 | 6/1966 | Cooper | 260 |
| 3,266,971 | 8/1966 | Miller | 117 |

FOREIGN PATENTS

| | | |
|---|---|---|
| 492,815 | 5/1953 | Canada. |
| 878,114 | 9/1961 | Great Britain. |

S. LEON BASHORE, *Primary Examiner.*